March 15, 1966 A. C. DAVIES ET AL 3,240,607
PROCESS AND APPARATUS FOR THE PRODUCTION OF FATTY PRODUCTS
Filed March 4, 1963
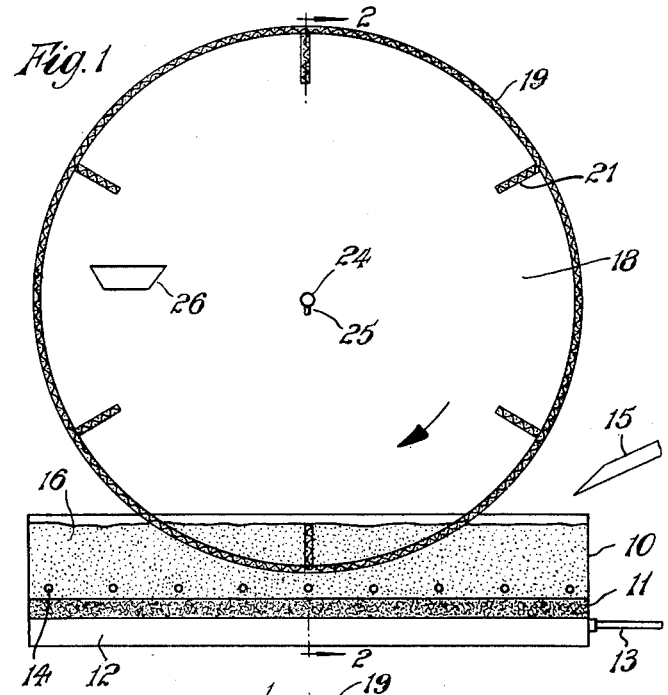
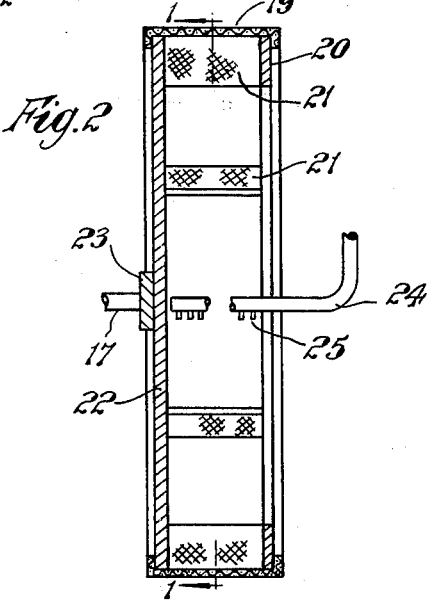

United States Patent Office 3,240,607
Patented Mar. 15, 1966

3,240,607
PROCESS AND APPARATUS FOR THE PRODUCTION OF FATTY PRODUCTS
Alan Charles Davies, Higher Bebington, Cheshire, and Vivian Desmond Worstall, Bebington, Cheshire, England, assignors to Lever Brothers Company, New York, N.Y., a corporation of Maine
Filed Mar. 4, 1963, Ser. No. 262,625
Claims priority, application Great Britain, Mar. 9, 1962, 9,276/62
9 Claims. (Cl. 99—118)

This invention relates to pellets and especially pellets containing a soft fusible organic material, for instance a fat, and to a process and apparatus for making such products.

By a soft fusible organic material is meant an organic material that melts gradually and that at summer temperature, for instance 20 to 25° C., is plastic or semi-liquid. A variety of such materials is to be found among fatty materials for instance fats (including mono- and di- as well as tri-glycerides), fatty acids, fatty alcohols and mixtures of esters (other than fats) of such acids and alcohols. By a harder fusible organic material is meant one that remains solid at a higher temperature than the soft fusible organic material.

The process of the invention provides a method of making pellets having a centre of soft fat or other fusible organic material surrounded by a coherent coating of a harder fat or other fusible organic material. Such products are believed to be broadly novel and they provide a very advantageous form in which to store and distribute various kinds of fatty and like materials.

The process of the invention comprises causing droplets of the softer material in the molten condition to fall onto a fluidised bed of finely divided particles of the harder material, at a temperature below the solidification point of the softer material, so that the said droplets are solidified by cooling while still in substantially spherical form and during cooling become coated with particles of the harder material which, by virtue of at least partial fusion, adhere to the solidified droplets and to one another to provide said droplets with a coherent coating, continually removing the pellets so formed and maintaining the supply of the harder particles to the fluidised bed.

The development of a satisfactory method ensuring continuous or semi-continuous production has involved much difficulty. In what is probably the best known kind of fluid bed apparatus a relatively deep bed is maintained in a vessel of conical form, the fluidising air being provided as a blast discharging upwards from the apex of the cone. Attempts to adapt this form of apparatus in carrying out the process of the invention, however, proved unsuccessful whether the system was arranged with a view to causing the pellets to progress downwards through the bed and discharge at the bottom or to flow off from the top. Particles of hard fats and the like of suitable size, for instance, 120 to 170 microns, were found difficult to fluidise effectively to depths greater than a few inches and the pressure drop through the fluidised bed of such materials was found always to vary substantially from that calculated on the assumption that the bed was behaving as a perfect fluid. It is known to fluidise finely divided material mechanically, for instance in shallow rotating drums, but this method was found unsuitable owing to serious distortion of the droplets and the resulting pellets. Nor were the coated pellets found to flow satisfactorily under gravity down an inclined plane unless the slope were very steep. Eventually, after much research, a satisfactory method was evolved using a shallow bed fluidised by innumerable jets of gas (preferably air jets issuing from a porous false bottom, for instance of porous tile), and suitably cooled (preferably by means of cooling pipes arranged immediately above the false bottom), mechanically removing the pellets in the upper part of the bed by means which, by virtue of the size of the pellets, pick up them but not the free particles of the harder material, and which do not substantially interfere with the free movement of the said particles or with the falling of the droplets onto the bed, and continually feeding further supplies of the said particles to the bed. For mechanically removing the pellets there was devised means comprising a perforate (preferably wire mesh) open-ended drum rotating about a horizontal axis and dipping into the fluid bed, this drum having radical perforate baffles which pick up the pellets from near the upper surface of the bed in one area while allowing the hard fat particles to pass, the baffles discharging the pellets onto a steeply inclined chute which enters the open end of the drum at a suitable height above the bed. Hopper means were provided to maintain the bed by supplying further quantities of the harder particles to the upper surface of the bed in another area.

One form of apparatus suitable for carrying out the process of the invention will now be described with reference to the accompanying diagrammatic drawings in which FIG. 1 is a sectional end elevation of the apparatus, and FIG. 2 is a sectional side elevation of the drum showing also the spraying means for the soft fat.

Referring now to the drawing, a vessel 10 of rectangular cross section is provided with a false bottom 11 of porous tile below which is a compartment 12 to which air under pressure can be supplied through the pipe 13. Immediately above the false bottom is a coil of cooling pipes 14 which can be supplied with cooled brine. A chute 15 discharges particles of the hard fat into the vessel, these particles being fluidised by the air streams from the porous tile to form a shallow fluid bed 16.

Mounted above the vessel 10 so as to rotate on a driven horizontal shaft 17 mounted in bearings which are not shown is an open-ended drum 18 having an outer side wall 19, an annular front plate 20 and six radial baffles 21, the side wall and baffles being constructed of stiff wire gauze. The rear end of the drum is closed by an end plate 22 having a central boss 23 carrying the shaft 17 that drives the drum. To facilitate maintaining steady temperature conditions the vessel 10 may be provided with a sheet metal cover inclosing the drum 18 and having an inlet aperture for chute 15 and pipe 24 (referred to below) and an outlet aperture for the chute 26 (referred to below).

Extending into the drum is a pipe 24 provided with jets 25 spaced along its length and directed downwards for showering the molten fat onto the fluid bed. Projecting also into the drum is a chute 26 for carrying off the pellets discharged into it by the baffles 21.

In operation the vessel 10 is charged with the hard fat in fine particulate form, the fat so charged is fluidised by supplying refrigerated air under pressure through the pipe 13 to the compartment 12, whence it issues through the pores in the porous tile partition 11, and the bed is further cooled by circulating refrigerated brine through the coils 14. Molten fat is supplied by the pipe 24 to the jets 25 whence it falls as drops onto the fluid bed where the drops become coated with the hard fat and solidify to form pellets. The drum 18 is rotated in the direction shown by the arrow in consequence of which the pellets are picked up by the baffles 21 from which the pellets are discharged as the baffles move upwards, and fall by gravity onto the chute 26.

Thus, apparatus according to the invention comprises a vessel for containing a relatively shallow fluidised bed of particles of the hard material, means associated with said vessel for receiving a continuous supply of gas under pressure and causing said gas to issue in the form of upwardly directed jets adapted to maintain said bed in fluidised condition, means for maintaining a shower of substantially uniform droplets of the soft material in molten form onto said bed, mechanical means for continually removing pellets of the soft material coated with the hard material from an area in the upper part of said bed without removing substantial proportions of free particles of the hard material or substantially interfering with the free movement of said particles or the falling of the droplets onto the bed and means for supplying fresh particles of the hard material to maintain the fluid bed. Means for maintaining the bed at a desired low temperature, preferably some 40 to 50° C. below the solidification temperature of the softer material may be incorporated, for instance, in the form of a cooling coil in the path of the air jets. The means for removing the pellets may with advantage comprise perforate conveying means moving through the bed, the size of the perforations and the relative areas of perforate and imperforate space being such as to allow the free particles of hard material, but not the pellets, to pass. Preferably the conveying means comprise a drum rotating about a horizontal axis and dipping into the vessel, said drum being open at one end and having a perforate curved wall and a plurality of perforate, evenly spaced, inwardly projecting radial baffles for picking up the pellets and carrying them to a discharge point above the vessel, discharge means are situated at said point for carrying the pellets out of the drum, and stationary downwardly directed jets are located inside the drum and above the vessel for showering the molten soft material onto the bed.

Instead of a drum other forms of conveying apparatus for removing the pellets from the bed without removing the uncoated particles, for instance means based on an endless perforate belt instead of a drum, may also be employed. It will be appreciated that in the perforate members of the conveying means for removing the pellets from the bed the size of the perforations should preferably be just small enough to retain coated particles of the smallest size which it is desired to obtain and that the total area of the perforations should be very much greater than the total area of the unperforate spaces between the perforations. A wire gauze construction for the perforate members is particularly suitable.

The following example illustrates the invention.

EXAMPLE

The apparatus was as shown in the drawing, the gauze of the drum being of 8 meshes to the inch and the jets for projecting the soft fat onto the fluid bed being 13 in number each of external diameter 3.5 mm., internal diameter 1.5 mm. and terminating in a flat face perpendicular to the axis of the passage in the jet.

The hard fat was palm oil hardened to an iodine value less than 2, in the form of a powder obtained by spraying the molten fat in air and of particle size such that 85% passed a 60 mesh per inch sieve and was retained by a 120 mesh per inch sieve.

The soft fat was whale oil hardened to a slip melting point of 33 to 35° C.

The cooling coils were supplied with brine at a temperature of −10 to −20° C., and the air was supplied at a temperature of 3° C., the bed temperature being −8 to −6° C.

The soft fat was fed to the jets at about 45° C. and at such a rate as to produce from each jet about 120 drops per minute, each of diameter approximately 3.75 mm.

The hard fat particles were fed to the bed at the rate of 600 grams per minute and the speed of the drum was adjusted so as to maintain the system in equilibrium, the pellets discharged being composed of a core of the soft fat amounting to 85% of the total weight, the remaining 15% consisting of a coating of the hard fat.

Instead of the hardened palm oil specified there may be used groundnut or cottonseed oil hardened to the same extent. The dilatation of the hard fat at 20° C., determined as described in British Patent No. 827,172 should preferably be not less than 2000 and may with advantage be 2500 or more. Its slip melting point should preferably be at least 45° C.

Instead of the soft fat described there may be used, for instance groundnut oil hardened to a slip melting point of 33 to 35° C. The dilatation at 20° C. of the soft fat determined by the method referred to above should be not less than 400. Its slip melting point may advantageously lie between 25 and 35° C.

A useful product for domestic cooking has been made by the process of the invention in the form of pellets containing (by weight) some 85% of a margarine fat blend, the coating being of fully hardened palm oil.

In the same way other combinations of a soft fusible organic material with a harder fusible organic material, may be treated to yield pellets having a core of the softer material with a coating of the harder material. Thus, for instance, a soft monoglyceride such as that of oleic acid may be used as the soft fat in conjunction with a hard monoglyceride or triglyceride, for instance of a stearic acid.

The invention is capable of producing pellets of coated fat for a variety of uses, including domestic cooking, biscuit manufacture (especially laminated biscuits such as cream crackers) and puff pastry manufacture. Fats for incorporation in animal feeding stuffs may also be advantageously prepared in pellet form by the methods of the invention.

What is claimed is:

1. Process for making pellets having a core of soft fatty material surrounded by a coherent coating of a harder fatty material, the soft and harder fatty materials having at least a 10° C. difference in slip melting point, which comprises causing droplets of the softer material in the molten condition to fall onto a fluidised bed of finely divided particles of the harder material at a temperature below the solidification point of the softer material so that the said droplets are solidified by cooling while still in substantially spherical form and during cooling become coated with particles of the harder material which, by virtue of at least partial fusion, adhere to the solidified droplets and to one another to provide said droplets with a coherent coating, continually removing the pellets so formed and maintaining the supply of the harder particles to the fluidised bed.

2. Process according to claim 1, wherein the bed is relativcely shallow and is fluidised by means up upwardly directed jets of gas and, by virtue of the size of the pellets, they but not the free particles of harder material are continually picked up and removed from the bed in the upper region thereof by mechanical means that do not substantially interfere with the free movement of said free particles in the bed and with the falling of the droplets onto the bed.

3. Process according to claim 1, wherein the soft fatty material has a fat of slip melting point between 25 and 35° C.

4. Process according to claim 1 wherein the hard material is a fat of slip melting point at least 45° C.

5. Process according to claim 1 wherein the hard material is a substantially fully hardened marine fat.

6. Apparatus which comprises a vessel for containing a relatively shallow fluidised bed of particles of a hard fatty material, means located near the bottom of said vessel for receiving a continuous supply of gas under pressure and causing said gas to issue in the form of upwardly directed jets operative to maintain said bed in fluidised condition, means for maintaining a shower of substantially uniform droplets of a soft fatty material in molten form onto said bed, mechanical means for continually removing the pellets of the soft material coated with the hard material from an area in the upper part of said bed without removing substantial proportions of free particles of the hard material and while allowing the free passage of said particles and the falling of the droplets onto the bed and means for supplying fresh particles of the hard material to maintain the fluid bed.

7. Apparatus according to claim 6, including a cooling coil situated in the path of the gas jets.

8. Apparatus according to claim 6 wherein the means for removing the pellets comprises perforate conveying means moving through the bed, the size of the perforations and the relative areas of perforate and imperforate space being such as to allow the free particles of hard material, but not the pellets, to pass.

9. Apparatus according to claim 8 wherein the conveying means comprise a drum rotating about a horizontal axis and dipping into the vessel, said drum being open at one end and having a perforate curved wall and a plurality of perforate, evenly spaced, inwardly projecting radial baffles for picking up the pellets and carrying them to a discharge point above the vessel, discharge means are situated at said point for carrying the pellets out of the drum, and stationary downwardly directed jets are located inside the drum and above the vessel for showering the molten soft material onto the bed.

References Cited by the Examiner
UNITED STATES PATENTS

| | | | |
|---|---|---|---|
| 1,395,934 | 11/1921 | Stackton | 99—118 |
| 1,524,968 | 2/1925 | Des Ylouses. | |
| 1,587,414 | 6/1926 | Pond | 99—166 |
| 2,065,676 | 12/1936 | Fechner | 99—118 |
| 2,463,870 | 3/1949 | Hansen | 99—118 |
| 2,484,792 | 10/1949 | Mollring | 264—7 |
| 2,500,056 | 3/1950 | Barr | 252—412 |
| 2,562,149 | 7/1951 | Mollring. | |
| 2,563,086 | 8/1951 | Verschoor | 209—474 |
| 2,951,262 | 9/1960 | Dorman et al. | 18—24 |
| 3,015,563 | 1/1962 | Rosenberg | 99—2 |
| 3,067,104 | 12/1962 | Hochberg et al. | 167—81 |

A. LOUIS MONACELL, *Primary Examiner.*